United States Patent [19]

Santner

[11] 4,352,037
[45] Sep. 28, 1982

[54] SEALED GENERATOR HOUSING

[75] Inventor: Fritz Santner, Graz, Austria

[73] Assignee: Elin-Union A.G., Vienna, Austria

[21] Appl. No.: 177,000

[22] Filed: Aug. 11, 1980

Related U.S. Application Data

[63] Continuation of Ser. No. 943,946, Sep. 20, 1978, abandoned.

[30] Foreign Application Priority Data

Sep. 23, 1977 [AT] Austria ............................ 6825/77

[51] Int. Cl.³ ............................................. H02K 5/00
[52] U.S. Cl. ....................................... 310/89; 310/87; 310/254; 277/101; 220/80
[58] Field of Search ................... 310/42, 89, 254, 258, 310/91, 85, 87, 88; 290/52, 54; 220/3 R, 5 A, 80, 81 R; 277/101, 128, 207 R, 207 A, 208

[56] References Cited

U.S. PATENT DOCUMENTS

| | | | |
|---|---|---|---|
| 3,084,959 | 4/1963 | Stanton | 277/208 |
| 3,334,928 | 8/1967 | Schmunk | 277/208 |
| 3,430,989 | 3/1969 | Wendt | 277/207 |
| 3,916,231 | 10/1975 | Cathey | 310/89 |
| 3,936,681 | 2/1976 | Liebe | 290/52 |
| 4,077,636 | 3/1978 | Langford | 277/207 |
| 4,102,599 | 7/1978 | Ziegler | 290/52 |

FOREIGN PATENT DOCUMENTS

| | | | |
|---|---|---|---|
| 1815471 | 8/1969 | Fed. Rep. of Germany | 290/52 |
| 1315657 | 12/1962 | France | 290/52 |
| 423671 | 10/1966 | Switzerland | 290/52 |
| 411005 | 6/1934 | United Kingdom | 310/87 |

Primary Examiner—R. Skudy
Attorney, Agent, or Firm—Ernest F. Marmorek

[57] ABSTRACT

A sealed generator housing has two components, one of which includes a circumferential bore having a cylindrical internal support surface, and the other of which has an end wall equipped with mounting segments, each of which has a mounting surface which contacts the support surface from within, centering the circumferential wall with respect to the end wall, while permitting relative axial sliding of the components. A gap is present between the two components, which permits such relative sliding due, for instance, to thermal expansion and contraction. An annular sealing member extends axially across the gap at the exterior of the housing and is entirely surrounded by a length-adjustable clamping strip exerting inwardly oriented pressure on the sealing element. The annular sealing element has bulges at its internal surface, such bulges being received in corresponding circumferential grooves of the two components of the housing extending alongside the gap. The annular sealing element is supported from within by support portions rigid with one of the components.

6 Claims, 4 Drawing Figures

SEALED GENERATOR HOUSING

This is a continuation of application Ser. No. 943,946, filed on Sept. 20, 1978, now abandoned.

BACKGROUND OF THE INVENTION

The present invention relates to sealed housings in general, and more particularly to a sealed housing of a submerged generator.

There are already known housings for use in submerged installations, such as generator housings for use in water, wherein the water flows around the housing when in use. This type of generator housing usually includes a generator stator which is constructed as a cylindrical structural component, and is arranged between a cupola-shaped upstream part, and a downstream part which is configurated as a tubular turbine housing, the generator stator being sealingly and threadedly connected to the latter.

For tubular bi-partite bodies having huge diameters of several meters, which must be sealed and in which telescoping of the tubular parts is not possible, owing to mounting considerations, axial shifts of the tubular body, caused by thermal dilation, must be permissible while maintaining mutual centering of all parts. Such extraordinarily hermetic mounting arrangements for hollow bodies are necessary, for instance, for tubular turbines of the submerged constructions, which are exposed to water pressure, and around which the water flows during the use of the generator housing.

The embodiments which have become known heretofore utilize one-piece sliding rings with annular seals accommodated therein. When the diameters are huge, it is no longer possible, for reasons of transportation, to make the sliding ring of one piece, so that separating joint seals must be additionally provided. Furthermore, bolts, screws and key elements are required for the sliding, which must also be sealed. An exchange or renewal of the annular seals is not possible without resorting to considerable disassembling procedures.

SUMMARY OF THE INVENTION

Accordingly, it is a general object of this invention to avoid the above-mentioned disadvantages.

More particularly, it is an object of the present invention to provide a sealed housing which is not possessed of the above-mentioned disadvantages of the prior-art housings of this type. Still another object of the present invention is to so design a sealed joint housing for use in submerged installations as to be simple in construction, inexpensive to manufacture, assemble and disassemble, and reliable nevertheless.

In furtherance of these objects and others which will become apparent hereafter, one feature of the present invention resides, more briefly stated, in a sealed housing, particularly of a submerged generator, which comprises a first housing component including a circumferential wall having an internally supported surface, centered on an axis at one end face of the circumferential wall; a second component having an end wall, and having at least one mounting surface centered on another axis, and so slidably contacting the support surface that the abovementioned axes coincide and the axial end face bounds with the end wall a gap, permitting relative axial displacement between the components; and means for sealing the gap. Advantageously, the second housing component further includes a plurality of mounting segments rigidly connected to the end wall of the second housing component and extending therefrom into the interior of the housing, each of the segments having a mounting surface thereon.

In a further development of the invention, the end wall of the second housing component may have a centering projection rigid therewith, which extends into the interior of the housing, the mounting segments resting against a radially outward surface of the centering projection. Advantageously, the segments are rigidly connected to the end wall of the second housing component by screws, which are arranged in two rows.

According to a further proposal of the invention, the sealing means includes an endless, especially glued, annular sealing element situated exteriorly of the housing, and extending substantially axially across the gap, and a clamping strip surrounding the sealing element and pressing the same inwardly with a predetermined adjustable pressure.

According to a further embodiment of the invention, the first and second housing components, respectively, have at least one circumferentially extending groove each, which is located alongside and spaced from the gap, the sealing element then having at least two bulges, preferably of part-circular cross-sections, each of which is received in one of the grooves.

In a further development of the basic idea of the present invention, there may be provided means for internally supporting the sealing element, such supporting means advantageously including support portions which contact the sealing element from within the gap. It is further advantageous when the support portions are rigidly connected to one of the components.

The advantage of the arrangement according to the invention, when compared to the heretofore known arrangements, resides in the substantial reduction in the disassembly work in the event that a renewal of the sealing ring is necessary. In the conventional arrangements, the entire generator stator had to be disassembled for this purpose. In the construction proposed in accordance with the invention, the sealing rings can be renewed or replaced without disassembling the generator stator. In fact, only the clamping strip, which covers the sealing ring, must be removed. Further advantages of the construction according to the invention, result from the possibility of mounting the mounting segments on the cupola-shaped second component, which is located upstream, in an individual manner, as a result of which no additional sealing elements need to be employed. Inasmuch as the sealing ring consists of an endless band, which is glued to one piece, even the disassembly and replacement of the same are simple.

Having so discussed the basic concepts of the present invention, the structural embodiment of the arrangement according to the present invention will now be discussed in more detail with reference to the accompanying drawings.

BRIEF DESCRIPTION OF THE DRAWINGS

FIG. 3 is a large scale fragmentary sectional view taken on the line A—A of FIG. 2a.

Figure 1:
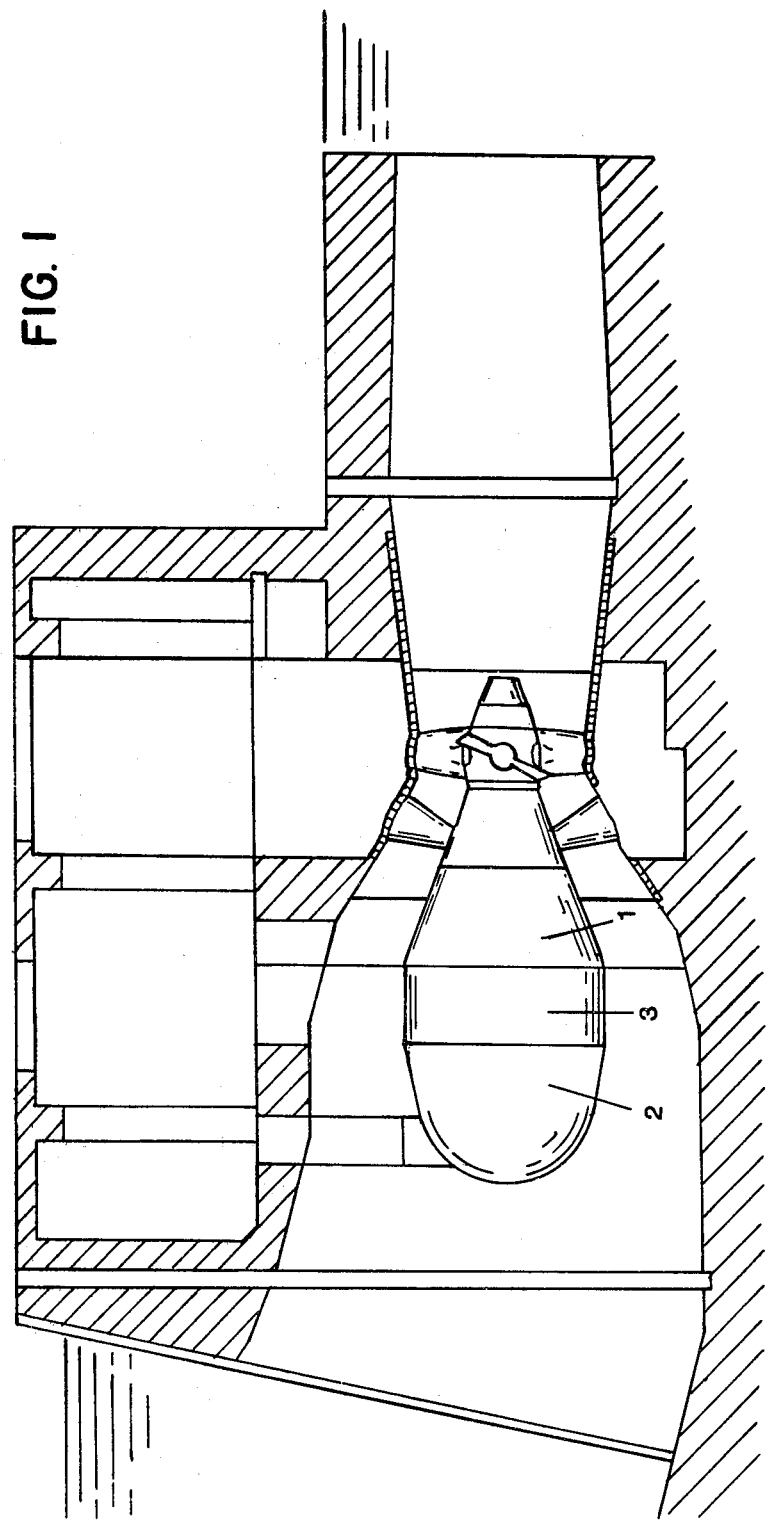
FIG. 1 is a fragmentary sectional view of a turbine type power generator.
Figures 2A, 2B:
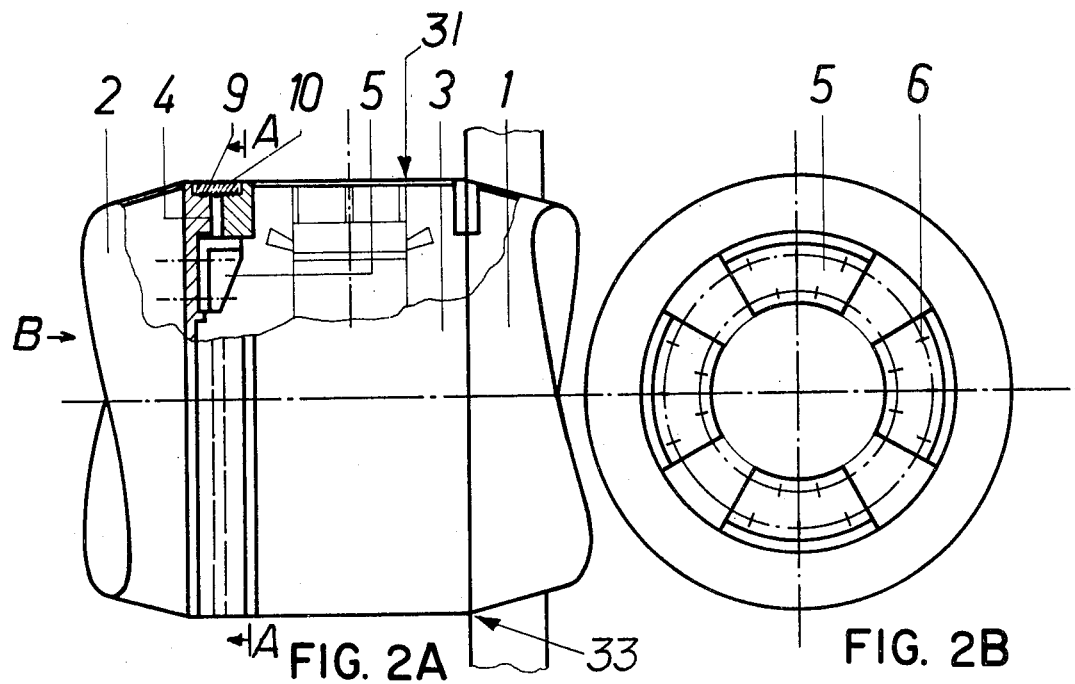
FIG. 2a is a fragmentary elevation view, partly in section showing a detail of FIG. 1.
FIG. 2b is an end elevational view thereof.
Figure 3:
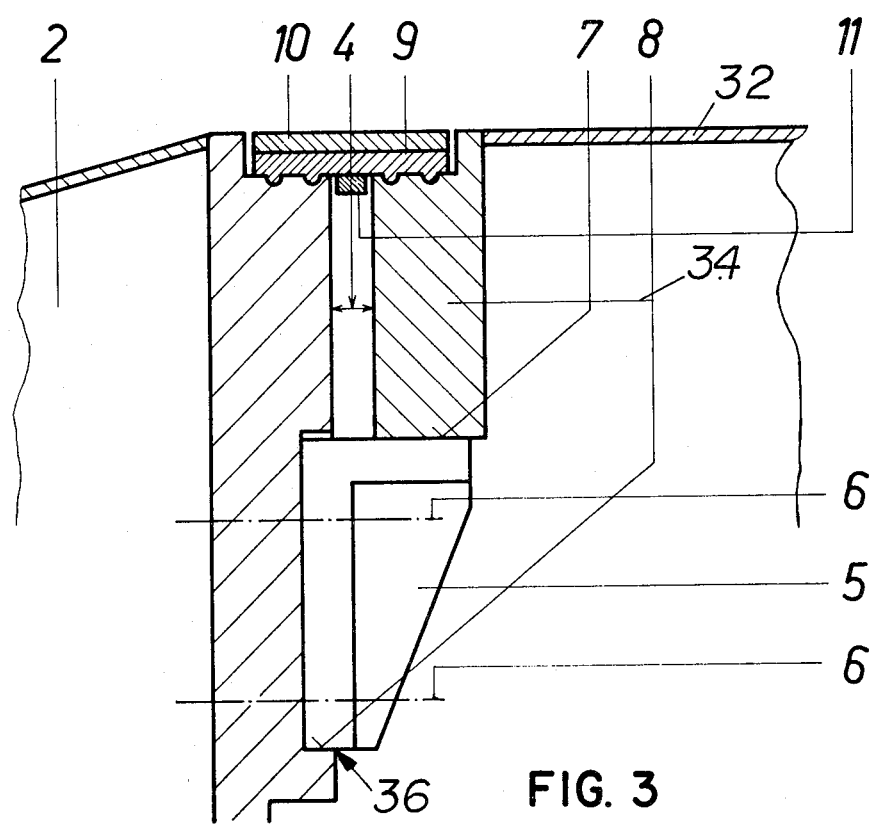

Referring now to the drawings in detail, and first to FIGS. 1 and 2a thereof, it may be seen that the sealed generator housing of the present invention includes a tubular turbine housing 1, and a cupola-shaped part 2, located upstream of the turbine housing 1 with respect to the direction of flow, denoted by the arrow B. The sealed generator housing 31 further includes a generator stator frame 32 which forms a part of a generator stator 3, (most details of which have been omitted,) which is to be positioned between the turbine housing 1, and the cupola-shaped part 2. The turbine housing 1 and the generator stator frame 32 are sealingly connected to one another in a conventional way, (not shown in detail) and they form a first housing component 33 with one another.

A mounting gap 4 is needed to provide the necessary play for the introduction of the generator stator frame 32 which gap 4 must be sealed with respect to the exterior of the generator housing 31, after the generator stator frame 32 has been aligned with the tubular turbine housing 1.

Before the sealing of the gap 4 can be performed, there must be obtained an exact, positive alignment between the cupola-shaped part 2, and the generator stator frame 32. This alignment is achieved with the aid of centering, a mounting portion, such as mounting or centering segments 5. The centering segments 5 also provide for their own axial shifting and sliding due to any of these mounting segments on, or close to, a support surface 7 of a bore of a part 34 of the generator stator frame 32.

The centering or mounting segments 5 are supported by a centering projection 8 of the cupola-shaped part 2, in an exact fit. The fixation of the centering mounting segments 5 to the part 2 is achieved by resorting to the cupola-shaped use of two rows of diagrammatically indicated screws 6. Once affixed, the mounting segments 5 form a second component 36 of the housing with the cupola-shaped part 2.

The mounting gap 4 is sealed by a one-piece glued band seal 9, which has two pairs of sealing bulges of part-circular configurations, which are accommodated in corresponding grooves of the cupola-shaped part 2, on the one hand, and of the part 34 of the generator stator frame 3, on the other hand. The required sealing pressure for the band seal 9 is exerted in an adjustable manner by a clamping strip 10, which is mounted at the exterior of the housing and surrounds the seal 9 and is exteriorly substantially flush with the portions of said part 2 and frame 3 adjacent the gap 4. Different types of clamping bands can be used in this environment.

In order to avoid the possibility that the band seal 9 could be pressed into the gap 4 by the external pressure exerted thereupon by water, there are provided support portions 11, which support the band seal 9 from within the housing. The support portions 11 can be formed integrally with, or be rigidly connected to, the cupola-shaped part 2, the part 34 of the generator stator frame 32, or the centering mounting segments 5. It will be appreciated that this particular type of sealing and mounting arrangement achieves all of the objects discussed above, assures exact centering of the two housing components 33 and 36 with respect to one another, provides for shifting of the components with respect to each other due to thermally caused expansion or contraction, and still achieves a perfect seal, despite the very simple construction of the sealing element.

Inasmuch as various changes and modifications may be made in the embodiment of the present invention, which has been discussed above and illustrated in the drawings, it will be appreciated by a person skilled in the art that the present invention is not limited thereto or thereby. Rather, the scope of the invention will be determined exclusively with reference to the accompanying claims:

I claim:

1. A sealing housing, particularly of a submerged fluid-powered generator
   comprising, in combination
   a turbine housing,
   a substantially cylindrical generator stator frame disposed upstream of said turbine housing, being sealingly connected thereto, and forming therewith a first housing component, said generator stator frame having an axial bore,
   a cupola-shaped part disposed upstream of said generator stator frame,
   a plurality of centering segments being secured to said cupola-shaped part and forming therewith a second housing component, said centering segments being slidable on the surface of said axial bore,
   a gap being defined between said cupola-shaped part and said generator stator frame, so as to permit relative axial displacement between said first and second housing components due to thermally caused expansion or contraction, and means for sealing said gap near the periphery of said generator stator frame and said cupola-shaped part exteriorly substantially flush with the portions of said cupola-shaped part and of said generator stator frame adjacent said gap.

2. A sealed housing as defined in claim 1, wherein said second housing component has a centering projection rigid therewith, which extends into the interior of the housing, and wherein said centering segments rest against a radially outward surface of said centering projection.

3. A sealed housing as defined in claim 1, wherein said sealing means includes an endless annular sealing element situated exteriorly of the housing and extending substantially axially across said gap, and a clamping strip surrounding said sealing element and pressing the same inwardly with a predetermined adjustable pressure.

4. A sealed housing as defined in claim 3, wherein said first and second housing components respectively have at least one circumferentially extending groove each, which is located alongside and spaced from said gap; and wherein said sealing element has at least two bulges each received in one of said grooves.

5. A sealed housing as defined in claim 3, and further comprising means for internally supporting said sealing element, including support portions contacting said sealing element from within said gap.

6. A sealed housing as defined in claim 5, wherein said support portions are rigidly connected to one of said components.

* * * * *